INVENTORS:
WILLEM C. J. QUIK
PIETER A. VAN WEEREN
BY: Harold S. Denkler
THEIR ATTORNEY United States Patent Office
3,449,078
Patented June 10, 1969

3,449,078
PROCESS FOR THE PREPARATION
OF HYDROGEN
Willem C. J. Quik and Pieter A. van Weeren, Amsterdam, Netherlands, assignors to Shell Oil Company, New York, N.Y., a corporation of Delaware
Filed Feb. 24, 1967, Ser. No. 618,533
Claims priority, application Netherlands, Mar. 17, 1966, 6603481
Int. Cl. C01b 1/16
U.S. Cl. 23—212                                10 Claims

ABSTRACT OF THE DISCLOSURE

Hydrogen is produced by the conversion of hydrocarbons in the presence of steam with a catalyst comprising rhenium supported on a carrier, with and without heavy metal promoters, stabilized by the addition of a small amount of alkali metal.

---

Figure 1:
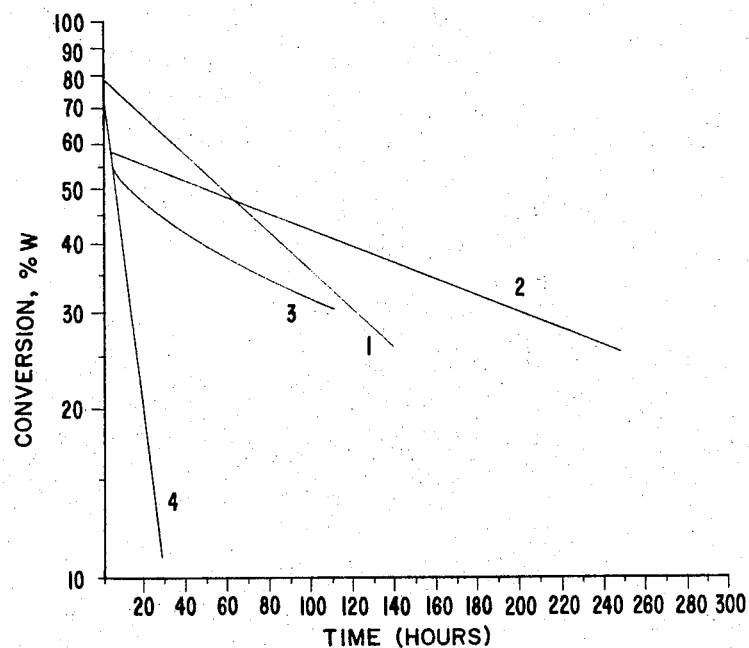

The preparation of hydrogen or hydrogen-containing gas mixtures by the conversion of hydrocarbons with steam is known to those familiar with the art. The catalyst usually employed in the conversion is nickel. Nickel is very active but is not resistant to sulfur, consequently, when it is used in the processing of sulfur-containing hydrocarbons, its activity is very soon lost.

This sensitivity of nickel catalysts to sulfur is a disadvantage in that the hydrocarbon fractions available to the petroleum industry usually contain sulfur. For practical operation of the process, it is necessary to first subject the hydrocarbon fraction to a thorough desulfurization process. For example, a sulfur-containing naphtha is first subjected to treatment with sulfuric acid in order to remove the major portion of the sulfur compounds after which the acid-treated naphtha is completely desulfurized by catalytic means.

It has recently been proposed to use rhenium catalysts rather than nickel. The rhenium catalysts are highly active, which permits the use of relatively low temperatures, and are resistant to poisoning by sulfur. In fact, the sulfide form of rhenium usually has the highest activity. The rhenium catalysts have a serious disadvantage in that they are not stable, i.e., activity rapidly decreases with use.

It has now been found that rhenium catalysts having incorporated therein a minor amount of alkali metal are stable for the conversion of hydrocarbons in the presence of steam to produce hydrogen. The alkali metal content of the catalyst is less than 2% w. As a rule, an optimum effect is obtained if the alkali metal content is below 1% w., preferably below about 0.5% w. To obtain appreciable benefit, the amount of alkali metal is about 0.1% w. Good results are obtained with about 0.2% w. (calculated on the quantity of carrier material).

In the present specification and claims, the term "alkali metal" refers to metals from the left-hand column of Group I of the Periodic System of elements. For reasons of economy, preference is given to lithium, sodium and potassium or mixtures of these metals, for instance, in the form of alkali metal hydroxides or alkali metal carbonates.

The rhenium can be present on the carrier in various forms, for instance, as metal and/or as an oxide. The sulfide form is preferred, however, as it has been found that rhenium sulfide usually possesses the highest activity.

It has further been found that activity and life of the rhenium catalysts can be increased by the use of promoters, such as metals from the right-hand column of Group I and/or metals of Group VIII of the Periodic System of elements. Particularly suitable promoters are silver, nickel, cobalt, copper and gold, either in the form of the metal or as a metal compound. Preferred promoters are cobalt and/or silver. The promoter is generally used in an amount from about 0.5% to 25% by weight.

The rhenium catalysts are preferably supported on a carrier. A preferred carrier is alumina, including natural or synthetic alumina. The presence of a certain amount of other oxides in the alumina is in general not detrimental. Thus the alumina can contain small amounts of silica, e.g., up to about 5% by weight and preferably no more than 0.5% by weight silica. Carriers with strongly acidic properties, such as silica-alumina cracking catalysts, are in general, not very suitable. In general, the carrier-supported catalysts will contain 1–25% w., and preferably 2–15% w., of rhenium.

The rhenium catalysts of the present invention can be prepared in any of the conventional ways. For example, a convenient method is to impregnate the carrier material with a solution of the desired salt or salts. The metals can be impregnated separately, or simultaneously from a common solution. The impregnated carrier is dried, and calcined. After calcination, the rhenium, which is in the oxide form can be reduced to the metal with hydrogen at a temperature of about 200–400° C. The rhenium can be sulfided by known means, such as with a mixture of hydrogen and hydrogen sulfide, or by a sulfur containing hydrocarbon. The sulfiding operation can be applied directly to the oxide form if desired.

For sulfiding with a hydrocarbon containing sulfur or organic sulfur compounds, hydrocarbon oil fractions boiling between 0 and 350° C., such as light gasolines, naphthas, kerosines and gas oils, can be used. Preferably hydrocarbon oil fractions are used which have been obtained by simple distillation of crude oil. Sulfiding with sulfur-containing hydrocarbon oil fractions is as a rule effected in the liquid phase and in the presence of hydrogen. Instead of pure hydrogen a hydrogen-containing gas may be applied, which may, if desired, contain hydrogen sulfide, such as the off-gas obtained in hydrofining hydrocarbon oil fractions.

Suitable starting materials for the preparation of hydrogen and hydrogen-containing gas mixtures are pure, normally gaseous and/or liquid hydrocarbons and mixtures of pure hydrocarbons as well as petroleum fractions, all with boiling points, or final boiling points, below 200° C. Very suitable, for example, are $C_5$ and $C_7$ fractions, whether aliphatic or naphthenic or aromatic in type, light straight-run fractions and light naphtha fractions, as well as hydrocarbon mixtures obtained by catalytic reforming or by the steam-cracking of light hydrocarbon-oil fractions.

If aromatic hydrocarbons are used as the starting material, it is found that they are dealkylated, not completely, but selectively. Thus, the reaction product obtained upon conversion of toluene consists of hydrogen, benzene, carbon dioxide and unconverted toluene, only traces of carbon monoxide and methane being formed. By recycling the nonconverted toluene, however, complete conversion into hydrogen, benzene and carbon dioxide can be achieved. It is observed that the quantity of hydrogen produced is sufficient or almost sufficient to convert the benzene produced into cyclohexane, if desired. In similar manner xylenes, ethylbenzene and higher alkylbenzenes, may, by the process of the present invention, be converted into benzene, hydrogen and carbon dioxide.

As mentioned hereinbefore, the rhenium catalysts are sulfur-resistant, which is an advantage in that sulfur-containing hydrocarbons and hydrocarbon mixtures can be used as starting materials without any preliminary desulfurization treatment. In cases where rhenium is used in its sulfide form, it is even advantageous for a certain amount of sulfur compounds, for example, 0.01–10% w., to be present in the starting material in order to counteract any loss of sulfur from the catalyst.

Sulfur compounds can also be used as starting materials. For instance, benzothiophene can be converted into toluene, which can subsequently react with steam to form benzene. The gas mixture formed in these reactions consists of hydrogen, carbon dioxide and hydrogen sulfide.

The conversion of hydrocarbons with steam using the present catalyst is generally effected at temperatures between 400 and 800° C., and preferably between 500 and 600° C. The latter temperature range is considerably lower than the temperature applied for instance, with nickel catalysts. At a working temperature of about 450 to 550° C., gas mixtures are obtained which contain mainly hydrogen and hydrocarbons with a lower molecular weight than that of the starting hydrocarbons. By a suitable choice of the starting material gas mixtures can be prepared under these temperature conditions which contain, not only hydrogen, but also hydrocarbons of higher value than those in the starting materials. Thus, light straight-run tops fractions may be converted in good yields into a mixture of hydrogen, propane and butane. Heavier fractions yield, in addition to propane and butane, liquid products with a reasonable octane number as well. From toluene, hydrogen and benzene are obtained.

The amount of steam employed in the present process is generally from about 1 to 40 moles, and preferably from about 2 to 30 moles per mole of hydrocarbon feed.

The present process is preferably operated under pressure. This is, both from a technological and from an economic viewpoint, of great advantage, because correspondingly smaller reactors will suffice. Too, hydrogen becomes available under pressure, which saves expensive gas compressors, as many processes in the oil and chemical industries require hydrogen under pressure. In general as higher pressures are used, higher hydrocarbon conversions are attained. For practical reasons, however, pressures higher than 80 kg./cm.$^2$ will not as a rule, be applied. Preferably pressures between 15 and 50 kg./cm.$^2$ are used.

For a number of applications, the hydrogen-containing gas mixtures obtained by the present process may be used as such. Should hydrogen of greater purity be required, undesirable constituents, such as carbon dioxide, hydrogen sulfide or hydrocarbons, can be removed entirely or partly in a known manner.

As conversion of hydrocarbons with steam is an endothermic reaction, it may, for technical or other reasons, be of advantage to carry out the reaction in the presence of oxygen or an oxygen-containing gas, such as air.

The present process can be operated in several stages, if desired. Higher temperatures are generally applied in the successive stages. Too, the present process can be operated in conjunction with a conventional water gas shift conversion to react any carbon monoxide with steam to produce carbon dioxide and additional hydrogen, according to the reaction equation:

$$CO + H_2O \rightarrow CO_2 + H_2$$

The partly or completely deactivated rhenium catalyst of the present process can be regenerated. The partly or completely deactivated catalyst is preferably regenerated by treating it at elevated temperature, for instance, 400–500° C., with a gas mixture containing oxygen and steam and subsequently resulfiding it by any of the processes described hereinbefore.

Figure 2:
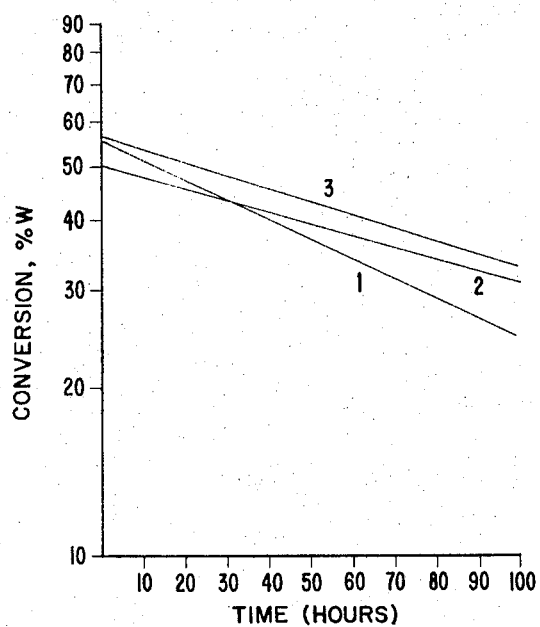

The invention will be illustrated with the following examples and with reference to the drawing in which FIGURE 1 shows stability of rhenium catalysts with and without potassium and FIGURE 2 shows stability of rhenium catalysts modified with various alkali metals.

EXAMPLE I

A rhenium catalyst with and without potassium is prepared by simple impregnation of alumina having a silica content of 0.2% w. After drying and calcining, catalyst A contains approximately 3% w. rhenium (expressed as metal) and catalyst B contains about 3% w. rhenium (expressed as metal) and 0.5% w. potassium. Sulfiding of each catalyst is effected with a hydrogen/hydrogen sulfide mixture (10% H$_2$S) as the temperature is raised over several hours from ambient temperature to 375° C.

When each catalyst is tested for the conversion of a light straight run hydrocarbon fraction boiling below 72° C. under the following conditions:

Temperature _____ 525° C.
Pressure _____ 45 kg./cm.$^2$.
Space velocity _____ 0.25 liters of hydrocarbon/liter of catalyst.
Steam/hydrocarbon ratio _____ 25 moles/mole.

it is readily seen that activity of catalyst A declines at a rapid rate whereas activity of catalyst B is quite stable and declines at a much lesser rate.

EXAMPLE II

A particularly attractive and very successful method of making a catalyst consists in depositing, through coprecipitation, rhenium, a promoter metal and alkali metal simultaneously on a carrier with the aid of a quantity of water corresponding to the absorptive power of the carrier for water, subsequently drying the resulting substance and then calcining it. To prepare a rhenium/silver/potassium/alumina catalyst, very favorable results are obtained by combining three aqueous solutions containing 15.5 g. Re$_2$O$_7$, 11.47 g. AgNO$_3$ and 1.1 g. K$_2$CO$_3$, respectively, dissolving the resultant precipitate in NH$_4$OH, bringing the volume of this solution to 325 ml. by adding water, and impregnating 310 g. alumina with it. After impregnation, the resulting substance is dried for 3 hours at 120° C. and calcined at 500° C. for 3 hours. Bulk weight of the catalyst is 0.70 g./ml.; surface area is 255 m.$^2$/g. and pore volume is 0.45 ml./g.

In the experiments described hereinafter, catalysts prepared by the procedure described in Example II were used. The catalyst had been placed in a tubular reactor in the form of a solid bed and consisted of particles whose diameter varied from 0.5 to 1.5 mm. The catalyst was previously sulfided by treating it for 4 hours with a mixture of hydrogen and hydrogen sulfide (ratio by volume 9:1), the temperature being gradually raised from 25 to 375° C. Subsequently, the desired reaction temperature was adjusted with the aid of steam and the process was started by introducing the starting material to be converted.

EXAMPLE III

In order to demonstrate the influence of the alkali metal content on catalyst stability, continuous experiments were effected under otherwise equal conditions, using catalysts of the following composition (in parts by weight):

Re:Ag:K:Al$_2$O$_3$=3.85:2.35:0    :100
Re:Ag:K:Al$_2$O$_3$=3.85:2.35:0.2:100
Re:Ag:K:Al$_2$O$_3$=3.85:2.35:0.5:100
Re:Ag:K:Al$_2$O$_3$=3.85:2.35:2.0:100

The starting material was a straight-run tops fraction boiling below 72° C. obtained by simple distillation of a Middle-East crude oil.

The experiments were carried out under the following reaction conditions:

Temperature _____ ° C __ 500
Pressure _____ kg./cm.² __ 40
Space velocity of tops _____ l./l. catalyst/hour __ 0.25
Steam/tops ratio _____ moles/mole __ 27

The results of the four experiments are shown in FIGURE 1. In FIGURE 1 the percentage conversion of the starting material (vertical axis) has been plotted against the number of run hours (horizontal axis). Curve 1 in this diagram shows the results for an alkali-free catalyst, curves 2, 3 and 4 show the results obtained with catalysts containing 0.2, 0.5 and 2.0 p.b.w. potassium per 100 p.b.w. alumina, respectively.

From this diagram it is evident that, under otherwise equal conditions, the stability of the alkali-free catalyst (curve 1) is a lower than that of the catalyst containing 0.5 p.b.w. potassium (curve 3). The highest stability was attained with a catalyst containing 0.2 p.b.w. potassium (curve 2). The stability of the catalyst containing 2 p.b.s. potassium (curve 4) is poor compared with that of the alkali-free catalyst (curve 1).

Analyses show that the addition of alkali metal to the catalyst has no appreciable influence on the composition of the reaction product.

The converted product contained 9% w. hydrogen and 46% w. propane and butane. The percentage conversion is, in this example, defined as being 100% minus the weight percent of reaction product having more than 4 carbon atoms per molecule.

The hydrogen content of the $C_2$ and lighter fraction after removal of carbon dioxide was 78% v. By "$C_2$ and lighter fraction," it is meant the fraction of the reaction product consisting of hydrogen, methane and ethane.

EXAMPLE IV

In order to establish the influence of the various alkali metals, sodium, potassium and lithium, on catalyst stability, three continuous experiments were carried out under the reaction conditions mentioned in Example III and with the same starting material.

The results of the experiments with catalysts always containing 3.85 p.b.w. Re, 2.35 p.b.w. Ag, 100 p.b.w. $Al_2O_3$ but containing 0.3 p.b.w. Na, K and Li, respectively, are presented in FIGURE 2.

In this diagram the percentage conversion of the starting material (vertical axis) has again been plotted against the number of run hours (horizontal axis).

Curve 1 of this diagram shows the results for a sodium-, curve 2 of a potassium- and curve 3 those of a lithium-containing catalyst.

FIGURE 2 shows that there is not a marked difference in stability between the lithium- and potassium-containing catalysts, but the sodium-containing catalyst is slightly less stable.

EXAMPLE V

Toluene was used as the starting material in this example. To avoid loss of sulfur from the catalyst, 0.1% w. sulfur (as thiophene) was added to the toluene. The following three experiments show the influence of the steam/toluene ratio and of temperature. The experiments were carried out at 40 kg./cm.² and a space velocity of 0.5 liter toluene per liter of catalyst per hour.

The catalyst contained per 100 p.b.w. alumina 3.85 p.b.w. rhenium, 2.35 p.b.w. silver and 0.2 p.b.w. potassium. The results of the three experiments are summarized in the table below.

| Temperature, ° C. | Steam/toluene, molar/ratio | Benzene in Liquid product, percent w.[1] | Purity of hydrogen [2] |
|---|---|---|---|
| 550 | 10:1 | 28 | 97 |
| 550 | 5:1 | 21 | 95 |
| 575 | 5:1 | 33 | 96 |

[1] The aromatics (benzene+toluene) content of the liquid reaction product was always >98%.

[2] Hydrogen purity expressed as $\dfrac{\text{percent v. } H_2}{\text{percent v. } (H_2+C_1+C_2)} \times 100$.

From this table it is evident that if the steam/toluene ratio is halved, the benzene production drops by 25% and that this drop may be compensated for by carrying out the conversion at a slightly higher temperature.

We claim as our invention:

1. A process for the production of hydrogen which comprises contacting steam and a hydrocarbon at an elevated temperature of about 400° C. to 800° C. with a catalyst comprising rhenium supported on a nonacid-acting refractory oxide having about 0.1% to 1% by weight alkali metal, whereby said rhenium containing catalyst is stabilized against activity loss.

2. The process according to claim 1 wherein the refractory oxide is alumina having less than 5% by weight silica and the amount of rhenium is from about 1% to 25% by weight.

3. The process according to claim 2 wherein the catalyst contains from about 0.5% to 25% by weight of a promoter selected from a group consisting of the metals of Group VIII, the metals from the right-hand column of Group I, and mixtures thereof.

4. The process according to claim 2 wherein the hydrocarbon is a hydrocarbon fraction boiling in the range from about 0 to 350° C. and the temperature is about 400 to 800° C.

5. The process according to claim 4 wherein the catalyst is sulfided.

6. The process according to claim 3 wherein the hydrocarbon is a hydrocarbon fraction boiling in the range from about 0 to 350° C. and the temperature is about 400 to 800° C.

7. The process according to claim 2 wherein the alumina contains less than 0.5% by weight silica, the catalyst comprises from about 2% to 15% by weight rhenium and from about 0.5% to 25% by weight silver.

8. The process according to claim 7 wherein the catalyst is sulfided, the hydrocarbon is a hydrocarbon fraction boiling in the range from about 0 to 350° C., and the temperature is about 400 to 800° C.

9. The process according to claim 7 wherein the hydrocarbon is an alkylaromatic, and the temperature is in the range from about 400 to 800° C.

10. The process according to claim 8 wherein the pressure is in the range from about 15 to 80 kg./sq. cm. and the amount of steam is in the range from about 1 to 40 moles per mole of hydrocarbon.

References Cited

UNITED STATES PATENTS

| 3,119,667 | 1/1964 | McMahon | 23—212 |
| 3,222,132 | 12/1965 | Dowden | 23—212 |
| 3,320,182 | 5/1967 | Taylor | 23—212 XR |
| 3,389,965 | 6/1968 | De Ruiter et al. | 23—212 |

EDWARD STERN, *Primary Examiner*.

U.S. Cl. X.R.

23—213; 252—439, 454, 455, 459, 463, 466